(12) United States Patent
Lutz et al.

(10) Patent No.: US 6,513,865 B1
(45) Date of Patent: Feb. 4, 2003

(54) MOTOR VEHICLE ROOF WITH A ROOF MODULE

(75) Inventors: Alfons Lutz, Emmering (DE); Thomas Ulbrich, Kaufering (DE); Stephan Wolfrum, Dachau (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/685,559

(22) Filed: Oct. 11, 2000

(30) Foreign Application Priority Data

Oct. 11, 1999 (DE) .......................... 199 49 468

(51) Int. Cl.$^7$ ................................ B60J 7/00
(52) U.S. Cl. .................. 296/216.01; 296/213; 296/214; 296/216.06; 296/216.08; 296/222; 296/216.02
(58) Field of Search ................................ 296/214, 213, 296/216.06–216.08, 222–223, 210, 216.02, 216.04, 216.01

(56) References Cited

U.S. PATENT DOCUMENTS

| | | | | |
|---|---|---|---|---|
| 2,122,712 A | * | 7/1938 | Bishop | 296/213 X |
| 3,016,263 A | * | 1/1962 | Rehmann | 296/216.04 |
| 5,540,478 A | * | 7/1996 | Schuch | 296/210 |
| 5,803,534 A | * | 9/1998 | Murkett et al. | 296/215 X |
| 6,213,542 B1 | * | 4/2001 | Clift | 296/214 |
| 6,279,989 B1 | * | 8/2001 | Marchart et al. | 296/210 X |

FOREIGN PATENT DOCUMENTS

| | | | | |
|---|---|---|---|---|
| DE | 3725807 | * | 2/1988 | 296/210 |
| DE | 41 13 872 | | 10/1992 | |
| DE | 196 34 853 | | 9/1997 | |
| DE | 197 02 336 | | 7/1998 | |
| EP | 529288 | * | 3/1993 | 296/218 |
| JP | 0128885 | * | 6/1987 | 296/213 |

OTHER PUBLICATIONS

Automotive Engineering Internatinal, p. 80, "Roof Modules: present and future", Apr. 2000.*

* cited by examiner

Primary Examiner—Dennis H. Pedder
(74) Attorney, Agent, or Firm—Nixon Peabody LLP; David S. Safran

(57) ABSTRACT

A motor vehicle roof with a roof opening (12) and a body-mounted carrier frame (38) to which a roof module (14) which fills the roof opening is attached, the roof module having a module frame (20) by means of which it is attached to the carrier frame, a cover (22) which can be pushed in the module frame in the lengthwise direction of the roof, and a rear window (24) which directly adjoins the cover to the rear in the closed position of the cover, and the module frame is made such that the cover and the rear window in their closed state adjoin the module frame, forming a seal. The rear window (24) can be raised with its rear edge.

17 Claims, 4 Drawing Sheets

MOTOR VEHICLE ROOF WITH A ROOF MODULE

BACKGROUND OF THE INVENTION

1. Field of the Invention

This invention relates to a motor vehicle roof with a roof opening and a body-mounted carrier frame to which a roof module, which fills the roof opening, is attached, the roof module having a module frame by means of which it is attached to the carrier frame, a cover which can be pushed in the module frame in the lengthwise direction of the roof, and a rear window which directly adjoins the cover to the rear in the closed position of the cover, and in which the module frame is made such that the cover and the rear window in their closed state adjoin the module frame, forming a seal, and a process for installation of such a motor vehicle roof.

2. Description of Related Art

A motor vehicle roof of the initially mentioned type is known from published German Patent Application No. DE 197 02 336 A1, in which the roof module comprises a sliding cover which consists, for example, of a pane of glass and a transparent rear window, and the sliding cover can be lowered from out of its closed position and can be moved to the rear to under the rear window. The module frame comprises an outside frame which is T-shaped in section and which is screwed to a guide rail of the module frame. The inner top edge of the outside frame is made such that the sliding cover, in its closed position, with a seal which is provided on its outer periphery adjoins from the bottom and the inside the inner edge of the outside frame to form a seal. The outer edge of the outside frame adjoins the side member of the roof, forming a seal. The defect in this known motor vehicle roof is that the ventilation possibilities and head room in the area of the rear window are limited.

German Patent Application No. DE 41 13 872 A1 discloses a motor vehicle roof in which the actual roof area and the rear window are combined into a single component which can be raised at its rear edge, and the rear window can also be raised with respect to the fixed roof part of the raisable component.

German Patent DE 196 34 853 C1 discloses a motor vehicle roof in which a roof module comprises a sliding cover which can be moved to the rear and a rear window which adjoins the sliding cover in the closed position to the rear. The sliding cover can be pushed to under the rear window or the rear window can be pushed forward to over the sliding cover. In the position on top of one another, the sliding cover and the rear window can also be pushed together as a package in the roof opening.

SUMMARY OF THE INVENTION

The primary object of this invention is to devise a motor vehicle roof which can be easily installed in an aesthetically pleasing manner and still offers good ventilation possibilities and head room. Furthermore, it is also an object of this invention to devise a corresponding installation process.

These objects achieved in accordance with the invention by a motor vehicle roof of the initially mentioned type being provided with a rear window which can be raised at its rear edge, and a process for installing a motor vehicle roof in which the roof module is centered with respect to the roof opening, the roof module is attached by means of the module frame to a body-mounted carrier frame, a gap remaining between the roof module and the edge of the roof opening, and a cover element being attached to the module frame and/or the edge of the roof opening such that it covers the module frame and the gap between the module frame and the edge of the roof opening from overhead and in the closed position of the cover and the rear window provides for sealing between the module frame and the edge of the roof opening.

In the motor vehicle roof in accordance with the invention, it is advantageous that the ability of the rear window to be raised enables good ventilation of the area of the rear window and better head room in the area of the rear window and moreover enables simple installation in that the roof module can be installed as a unit which is itself sealed.

The installation process according to the invention enables simple installation and effective sealing of the roof module with respect to the edge of the roof opening.

In one preferred embodiment of the invention there is a peripheral cover element which covers, from above, the module frame and the gap between the module frame and the edge of the roof opening, and in the closed position of the cover, the rear window provides for sealing between the module frame and the edge of the roof opening. This facilitates the installation of the roof module.

The cover element is preferably made or attached such that it can equalize tolerances with respect to the relative position of the cover and the rear window. Preferably, the cover element rests on the edge of the cover from overhead in its closed position.

The module frame comprises, preferably, a base frame and an intermediate frame which is attached thereto and which forms the contact area of the cover and the rear window. The base frame preferably comprises a gutter and a guide rail for the cover.

The cover and the rear window are preferably transparent.

In another embodiment of the invention, an opaque headliner can be attached to the module frame by the fact that the headliner can be pushed outward onto the module frame from the center of the roof, and in the end position, can be locked to the module frame.

Preferably, the roof module can be installed by pushing it through the front window opening.

To facilitate installation, in the middle of the front area of the module frame which runs crosswise, there can be a centering cone which interacts with a body-mounted counterpart in order to center the roof module in installation forward. Preferably, in the side edge area of the rear area of the module frame which runs crosswise, there is a centering element which interacts with a body-mounted counterpart in order to center the roof module during installation to the rear, the centering elements being preferably centering pins and the counterparts preferably being centering forks which are used for fixing the roof module in the lengthwise direction of the motor vehicle. Furthermore, the module frame and the carrier frame can be made such that tolerances can be compensated in the installation by lengthwise holes or length-compensating screw elements.

Two embodiments of the invention are explained below by way of example using the accompanying drawings.

DETAILED DESCRIPTION OF THE INVENTION

Figure 1:
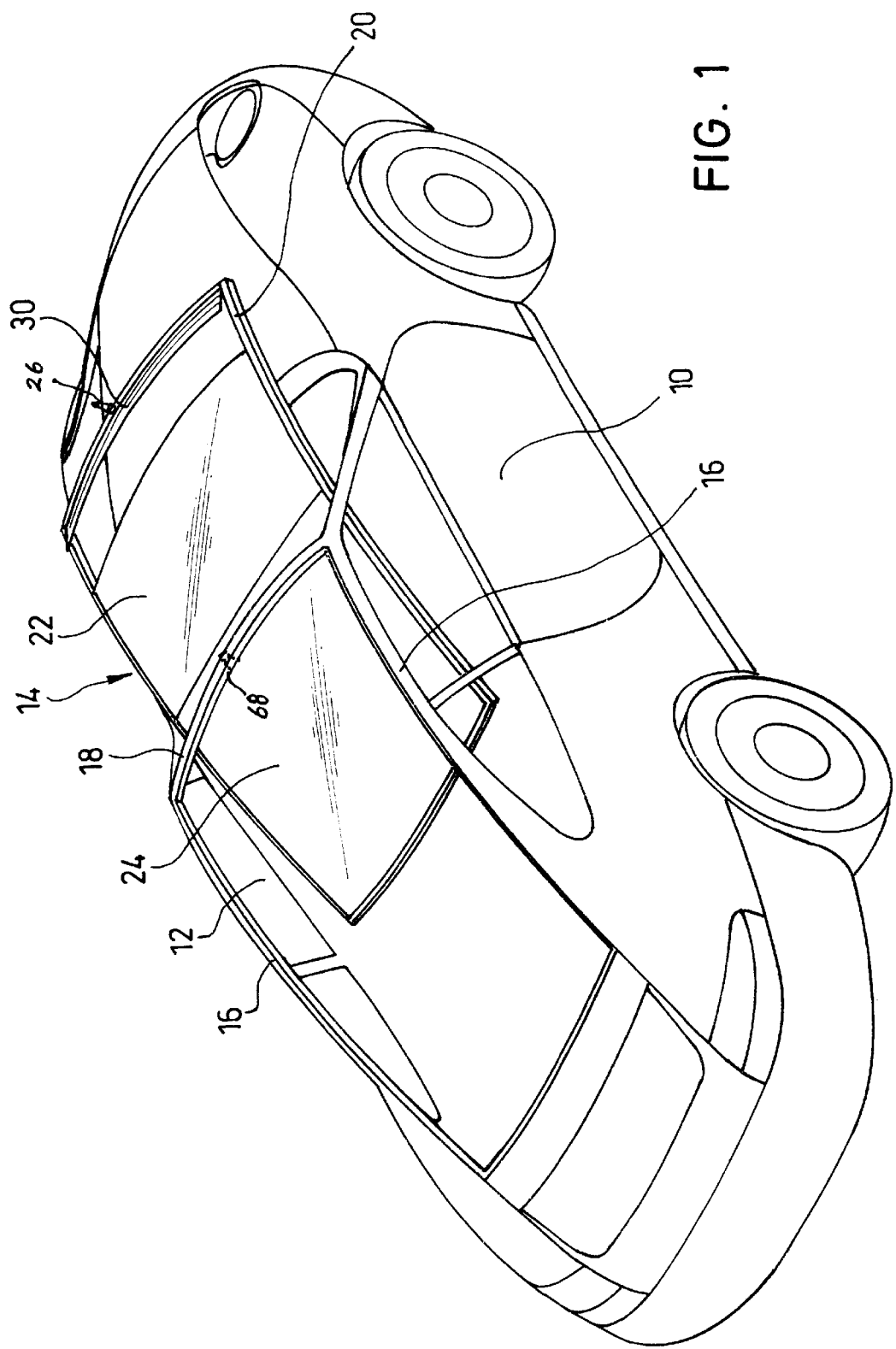
FIG. 1 is a perspective view of a motor vehicle roof in accordance with the invention during installation.

FIG. 1 shows a motor vehicle 10 with a roof opening 12 into which a roof module 14 is inserted via the front window opening. The roof opening 12 is bordered laterally by the side members 16 and bordered from the front by a cross member 18. The roof module 14 comprises a module frame 20 in which a transparent sliding cover 22 is supported to move in the lengthwise direction of the roof and which bears a transparent rear window 24 which can be raised at its rear edge and which joins rearwardly adjoins the cover 22 in the closed position of the cover 22. The cover 22 can be pushed to the rear to under the rear window 24 in order to selectively expose part of the roof opening 12.

Figure 3:
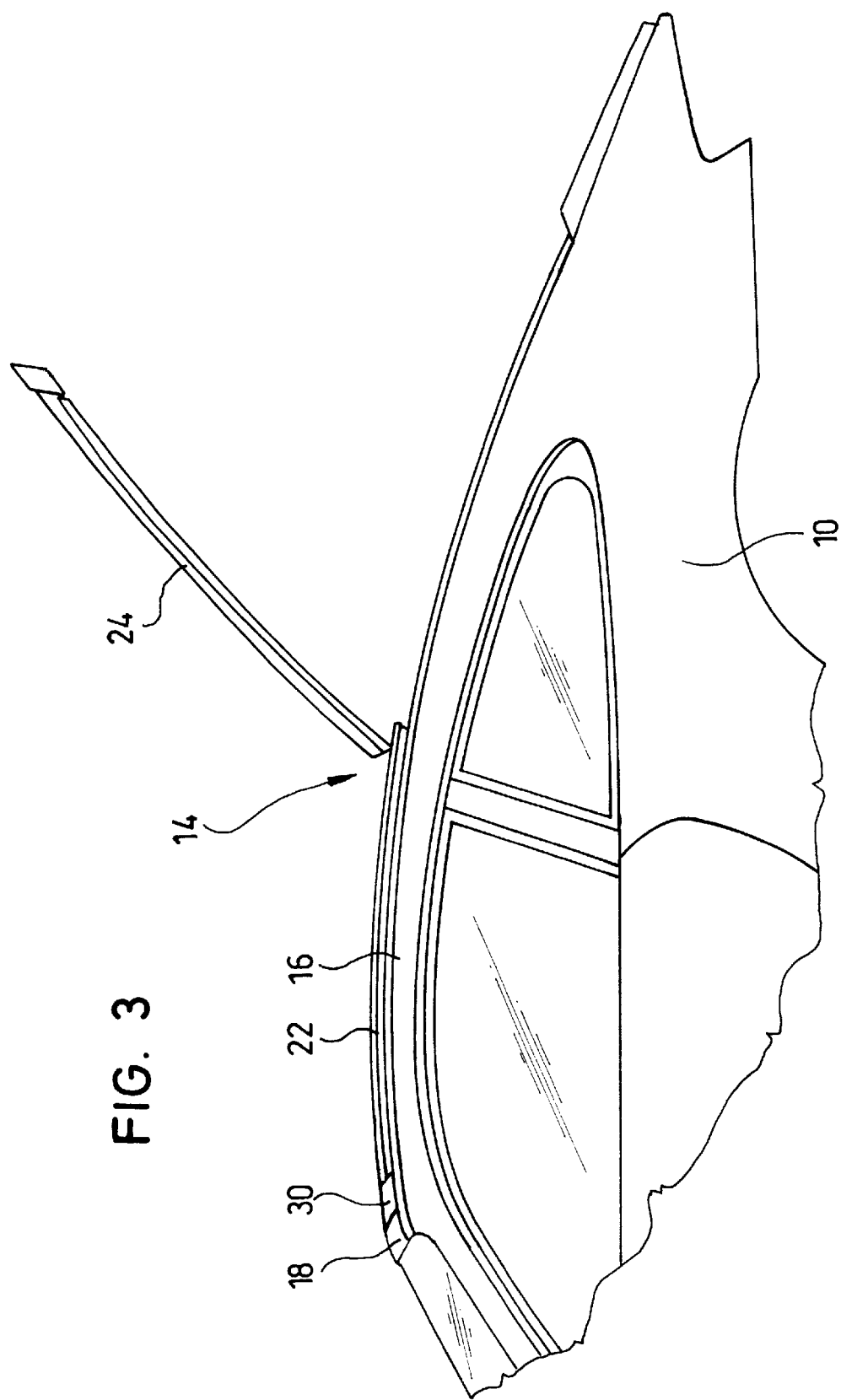
FIG. 3 is a side view of the motor vehicle roof of FIGS. 1 & 2.

The rear window 24 is shown in FIG. 3 in the fully swung-out state, by which the rear area of the vehicle interior is ventilated and the head room of the passengers on the rear seat is increased. When driving, the rear window 24 is raised less dramatically than is shown in FIG. 3.

As shown in FIG. 1, in the area of the middle of the front cross member 18, there is a counterpart 68 for the centering cone 26, which is provided in the center of the underside in the front area of the module frame 20 which runs crosswise (below a wind deflector 30 in the illustrated embodiment and thus not visible from above), in order to center the roof module 14 during installation in front. In each of the side edge areas, at the underside of the rear transversely running area of the module frame 20, there is a centering element 28 (shown in phantom outline in FIG. 2) which interacts with a body-mounted counterpart in order to center the roof module 14 during installation. The centering elements 28 are made as centering pins, while the counterparts are centering forks. The centering forks are furthermore used to fix the roof module 14 in the lengthwise direction of the motor vehicle, the pins moving into the forward-facing open ends of the forks as the module is inserted in a rearward direction. Moreover, tolerances in installation can be equalized by lengthwise holes or length-equalizing screw elements (not shown). The length-equalizing screw elements are used to equalize the tolerance in the transverse direction of the motor vehicle.

On the front end of the roof module 14, there is a wind deflector 30 which can be raised at its rear edge in order to reduce the incident flow noise when the cover 22 opened.

Figure 2:
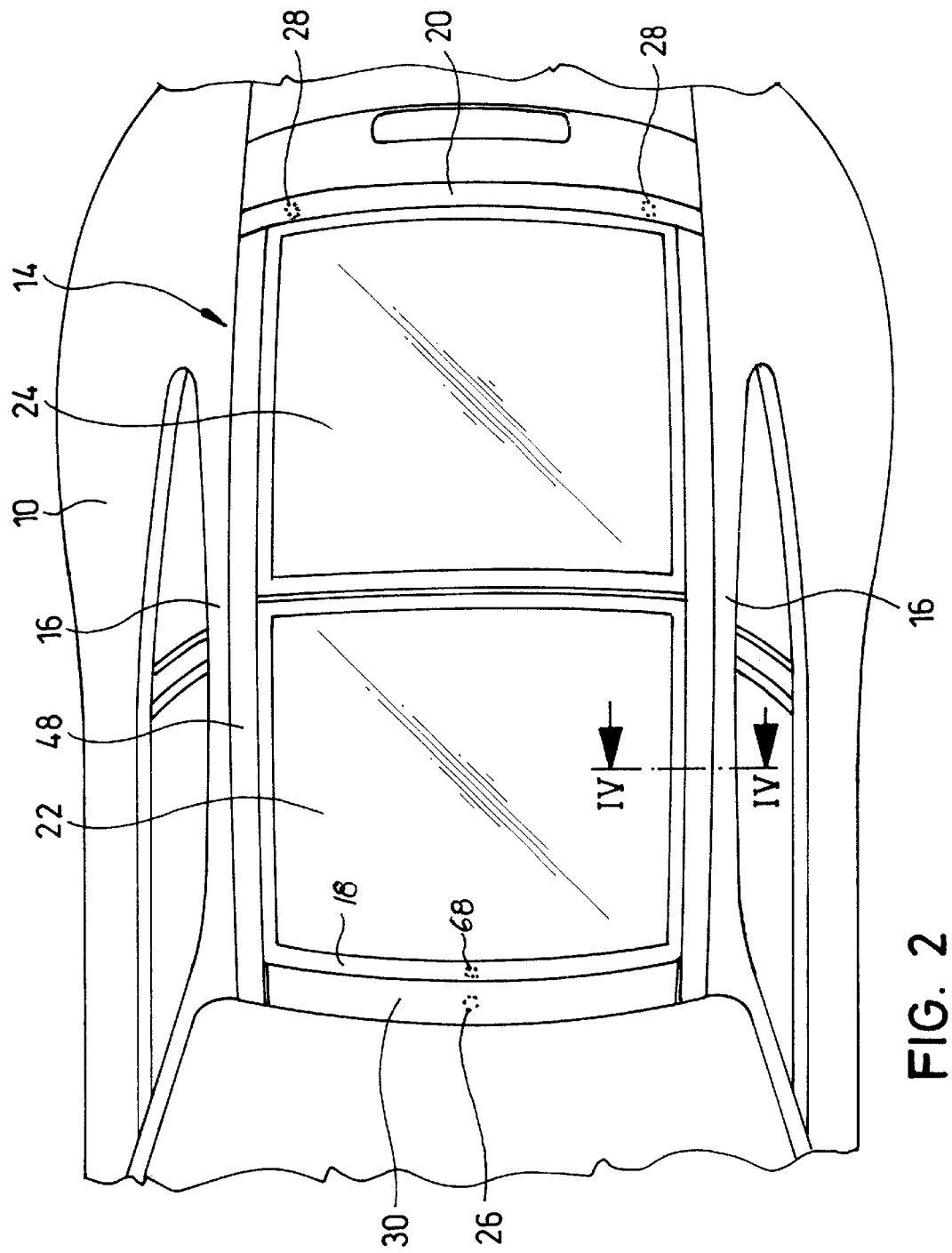
FIG. 2 is a plan view of the motor vehicle roof from FIG. 1 in the installed state.
Figure 4:
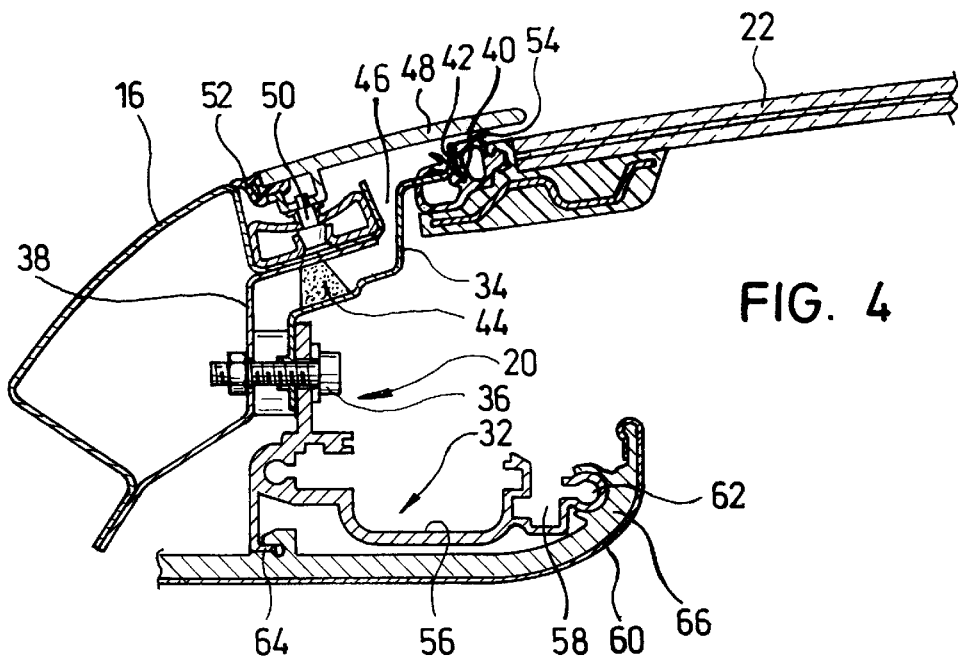
FIG. 4 is a cross section taken along line IV—IV in FIG. 2.

FIG. 4 is a sectional view along the line IV—IV in FIG. 2, which shows that the module frame 20 comprises a base frame 32 and an intermediate frame 34 which is attached to it by means of screw connections 36 which also attached frames 32, 34 to the body-mounted carrier frame 38 which is formed on the side member 16. The cover 22 is provided on its outer edge with a seal 40 which adjoins the contact area 42 of the intermediate frame 34 from the bottom and the inside to form a seal in the closed position of the cover 22. The roof module 14 is sealed by this structure before installation on the motor vehicle 10 in itself, and a corresponding sealing check can be performed before installation.

In addition to the screw connection 36, the intermediate frame 34 can be cemented to the carrier frame 38 by means of an adhesive connection 44.

The gap 46 which remains in the installation of the roof module 14 between the module frame 20 and the carrier frame 38 or the side member 16 is covered from overhead, after installation of the roof module 14, with a cover element 48 which is mounted on the side member 16 or the carrier frame 38 by means of an attachment 50. The cover element 48, on its outer end, has a seal 52 which seals between the cover element 48 and the side member 16. The bottom of the inner end (with respect to the transverse direction of the motor vehicle) of the cover element 48 is used as a contact surface for a sealing lip 54 of the cover seal 40 to provide for sealing between the cover element 48 and the cover 22 in the closed position of the cover 22. In this way, the cover element 48 achieves a seal between the module frame 20 and the side member 16. Instead of resting on the cover seal 40, the cover element 48 can also rest on the top end of the intermediate frame 34, forming a seal in order to seal the gap 46. The seal is preferably shaped in this way in the area of the raisable rear window 24.

The attachment 50 of the cover element 48 is made such that it provides for the possibility of adjustment of the position of the cover element 48 in order to equalize tolerances in the transverse direction and the vertical direction of the motor vehicle.

The base frame 32 comprises a gutter 56 and a guide rail 58 for guiding the cover 22 in the lengthwise direction of the roof. Furthermore, the base frame 32 is made as an attachment for a movable opaque headliner 60, which serves as vision screen, is made from leather, fabric or the like. Here, the opaque headliner 60, when installed from inside to outside is slipped onto a cylindrical profile 62 or a strip 64, the corresponding receivers being made on the liner support 66 such that the liner support 66 locks in the end position. This type of attachment requires especially little space in the vertical direction of the motor vehicle.

Figure 5:
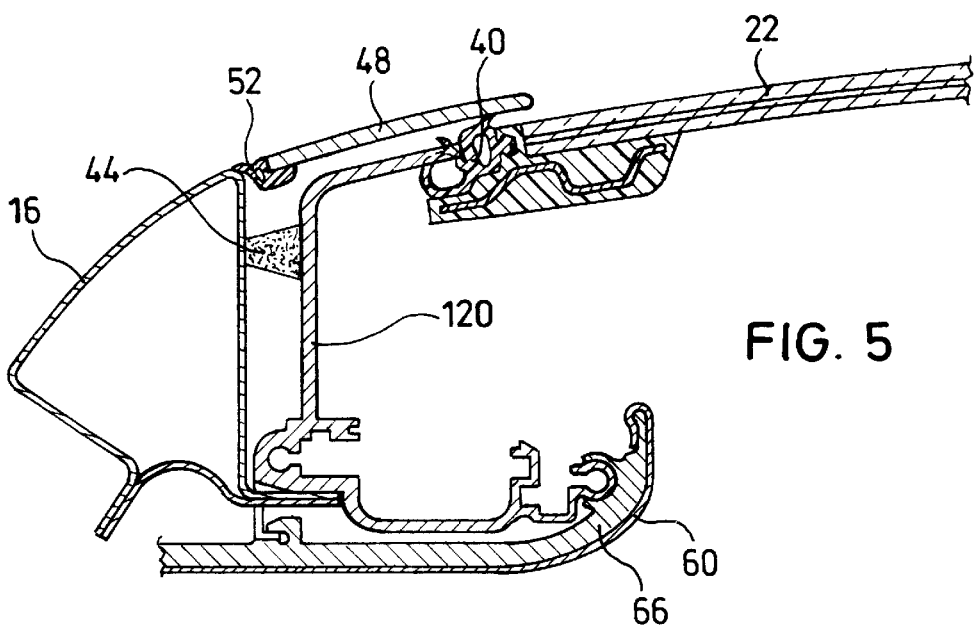
FIG. 5 is a view similar to FIG. 4, but showing a second embodiment of the invention.

FIG. 5 shows an alternative to the embodiment of the module frame which is shown in FIG. 4 and which differs essentially in that the module frame is made in one piece, i.e., the intermediate frame and the base frame from FIG. 4 are made as a one-piece unit to form the module frame 120.

The aforementioned construction of the motor vehicle roof offers the following advantages: There are no disruptive joints or sheet metal surfaces between the glass roof and the rear window, the roof module can be delivered for installation already checked for tightness, there are diverse possibilities for equalizing production tolerances, problems which can be attributed to disruptive joints are reduced and a uniform appearance of the installed motor vehicle roof is achieved.

What is claimed is:

1. Motor vehicle roof with a roof opening and a body-mounted carrier frame to which a roof module, which fills the roof opening, is attached, the roof module having a module frame by means of which it is attached to the carrier frame, a cover which can be pushed in the module frame in the lengthwise direction of the roof, and a rear window which directly adjoins the cover to the rear in the closed position of the cover, and in which the module frame is made such that the cover and the rear window in their closed state adjoin the module frame, forming a seal; wherein the rear window can be raised at its rear edge.

2. Motor vehicle roof as claimed in claim 1, further comprising a cover element which covers the module frame and a gap between the module frame and an edge of the roof opening from above; and wherein the cover element provides for sealing between the module frame and the edge of the roof opening in the closed position of the cover and the rear window.

3. Motor vehicle roof as claimed in claim 2, wherein the cover element is capable of equalizing tolerances in the transverse and vertical directions of the motor vehicle.

4. Motor vehicle roof as claimed in claim 3, wherein the cover element rests on an edge of the cover from above in the closed position of the cover.

5. Motor vehicle roof as claimed in claim 1, wherein the module frame is made in one piece.

6. Motor vehicle roof as claimed in claim 1, wherein the module frame comprises a base frame and an intermediate frame which is attached thereto and which forms a contact area for the cover and the rear window.

7. Motor vehicle roof as claimed in claim 6, wherein the base frame comprises a gutter and a guide rail for the cover.

8. Motor vehicle roof as claimed in claim 1, wherein the cover and the rear window are transparent.

9. Motor vehicle roof as claimed in claim 1, wherein a raisable wind deflector is provided in front of the cover.

10. Motor vehicle roof as claimed in claim 1, wherein an opaque headliner is attachable to the module frame, the headliner being outwardly displaceable onto the module frame in a direction from a center area of the roof into an end position in which the headliner locked onto the module frame.

11. Motor vehicle roof as claimed in claim 1, wherein the roof module is pushable through a vehicle front window opening for installation.

12. Motor vehicle roof as claimed in claim 1, wherein, in a center of a crosswise running front area of the module frame, a centering cone is provided which interacts with a body-mounted counterpart in a middle of a front area of the carrier frame which runs crosswise in order to center a front end area of the roof module during installation.

13. Motor vehicle roof as claimed in claim 12, wherein, in each side edge area of a crosswise running rear area of the module frame, a rear centering element is provided.

14. Process for installing a motor vehicle roof module which has a module frame, a cover which can be moved in the module frame in a lengthwise direction of the roof, and a rear window which directly adjoins the module frame to the rear in a closed position thereof and which can be raised at its rear edge, and in which the module frame is made such that the cover and the rear window in their closed state adjoin the module frame to form a seal, comprising the steps of:

inserting the roof module into a roof opening of a motor vehicle;

centering the roof module with respect to the roof opening;

attaching the roof module by means of the module frame to a body-mounted carrier frame, a gap remaining between the roof module and an edge of the roof opening, and attaching a cover element to at least one of the module frame and the edge of the roof opening such that the cover element covers an edge area of the module frame and the gap between the module frame and the edge of the roof opening from overhead, and provides for sealing between the module frame and the edge of the roof opening.

15. Process for installing a motor vehicle roof module according to claim 14, wherein said roof module is inserted through a vehicle front windshield opening during said inserting step.

16. Process for installing a motor vehicle roof module according to claim 14, herein said centering step is performed using a centering cone which interacts with a body-mounted counterpart in a middle of a front area of the module frame which runs crosswise in order to center a front end area of the roof module during installation.

17. Process for installing a motor vehicle roof module according to claim 14, wherein said centering step is performed using a rear centering element which is provided in each side edge area of a crosswise running rear area of the module frame which interacts with a body-mounted counterpart in order to center a rear end area of the roof module during the installation.

* * * * *